(12) United States Patent
Higashimachi et al.

(10) Patent No.: US 9,718,423 B2
(45) Date of Patent: Aug. 1, 2017

(54) VEHICLE BUMPER STRUCTURE INCLUDING A PEDESTRIAN COLLISION DETECTION SENSOR

(71) Applicant: TOYOTA JIDOSHA KABUSHIKI KAISHA, Toyota-shi, Aichi-ken (JP)

(72) Inventors: Naoya Higashimachi, Toyota (JP); Yusuke Mase, Okazaki (JP); Yasushi Nagaoka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/876,608

(22) Filed: Oct. 6, 2015

(65) Prior Publication Data

US 2016/0101753 A1 Apr. 14, 2016

(30) Foreign Application Priority Data

Oct. 10, 2014 (JP) ................................. 2014-209469

(51) Int. Cl.
*B60R 19/48* (2006.01)
*B60R 21/0136* (2006.01)
(Continued)

(52) U.S. Cl.
CPC .......... *B60R 19/483* (2013.01); *B60R 19/023* (2013.01); *B60R 19/44* (2013.01); *B60R 21/0136* (2013.01)

(58) Field of Classification Search
CPC ..... B60R 19/02; B60R 19/023; B60R 19/483; B60R 21/01; B60R 21/013; B60R 21/0136
(Continued)

(56) References Cited

U.S. PATENT DOCUMENTS 5,104,026 A 4/1992 Sturrus et al.
5,306,058 A 4/1994 Sturrus et al.
(Continued)

FOREIGN PATENT DOCUMENTS

CN 101048300 A 10/2007
CN 101258058 A 9/2008
(Continued)

OTHER PUBLICATIONS

Feb. 24, 2016 extended Search Report issued in European Patent Application No. 15188690.0.
Mar. 9, 2017 Office Action issued in U.S. Appl. No. 15/193,537.

*Primary Examiner* — Jason S Daniels
(74) *Attorney, Agent, or Firm* — Oliff PLC

(57) ABSTRACT

A vehicle bumper structure including: bumper reinforcement at a rear of a bumper cover; an absorber in front of the bumper reinforcement; and a pedestrian collision detection sensor including a pressure tube between the bumper reinforcement and the absorber, wherein a position of a width direction outer end of the bumper reinforcement is set between a first normal line and a second normal line, where a front-rear reference line passes through a width direction outer end of a front hood or apron upper member and extends along a front-rear direction, the first normal line passes through an intersection point between the front-rear reference line and the bumper cover and extends along the direction of a normal line with respect to the width direction outer end of the bumper reinforcement, and the second normal line is offset by 100 mm to a width direction inner side of the first normal line.

7 Claims, 8 Drawing Sheets

(51) Int. Cl.
  *B60R 19/02* (2006.01)
  *B60R 19/44* (2006.01)

(58) Field of Classification Search
  USPC ............. 296/187.04, 187.09, 187.1; 293/109
  See application file for complete search history.

(56) References Cited

U.S. PATENT DOCUMENTS

| | | |
|---|---|---|
| 2006/0087132 A1 | 4/2006 | Tanabe |
| 2007/0114803 A1 | 5/2007 | Takahashi et al. |
| 2008/0122599 A1 | 5/2008 | Suzuki et al. |
| 2009/0108598 A1 | 4/2009 | Takahshi |
| 2009/0322107 A1* | 12/2009 | Takahashi ........... B60R 21/0136 293/121 |
| 2010/0038922 A1 | 2/2010 | Takahashi et al. |
| 2013/0013156 A1* | 1/2013 | Watanabe ........... B60R 21/0136 701/45 |
| 2013/0127190 A1 | 5/2013 | Shamoto |
| 2014/0265445 A1 | 9/2014 | Leach |
| 2015/0274119 A1 | 10/2015 | Schondorf |
| 2016/0039376 A1 | 2/2016 | Narita |
| 2016/0288750 A1 | 10/2016 | Nickel et al. |
| 2016/0347270 A1 | 12/2016 | Higashimachi |
| 2017/0043735 A1 | 2/2017 | Yamaguchi et al. |

FOREIGN PATENT DOCUMENTS

| | | |
|---|---|---|
| CN | 102939222 A | 2/2013 |
| DE | 10 2010 000 224 A1 | 8/2010 |
| DE | 20 2011 105 867 U1 | 10/2011 |
| EP | 2 559 597 A1 | 2/2013 |
| JP | H05-97007 A | 4/1993 |
| JP | H07-246894 A | 9/1995 |
| JP | 2005-186677 A | 7/2005 |
| JP | 2006-118982 A | 5/2006 |
| JP | 2007-069707 A | 3/2007 |
| JP | 2007-216804 A | 8/2007 |
| JP | 2011-245910 A | 12/2011 |
| JP | 2012-056452 A | 3/2012 |
| JP | 2014-505629 A | 3/2014 |
| JP | 2015-150906 A | 8/2015 |
| KR | 2008-0032253 A | 4/2008 |
| KR | 2014-0005290 A | 1/2014 |
| WO | 2011128971 A1 | 10/2011 |
| WO | 2012/113362 A1 | 8/2012 |

* cited by examiner

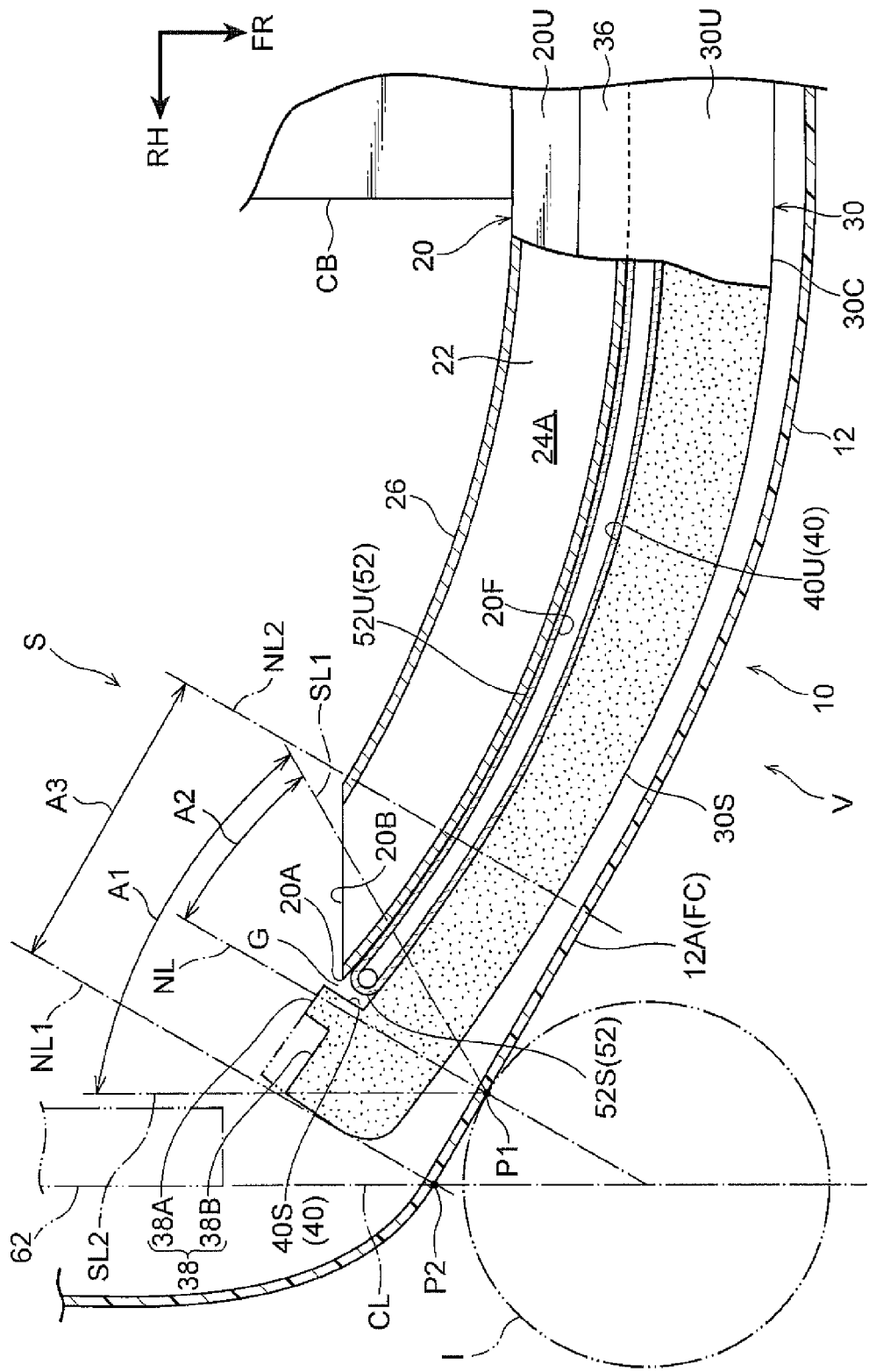

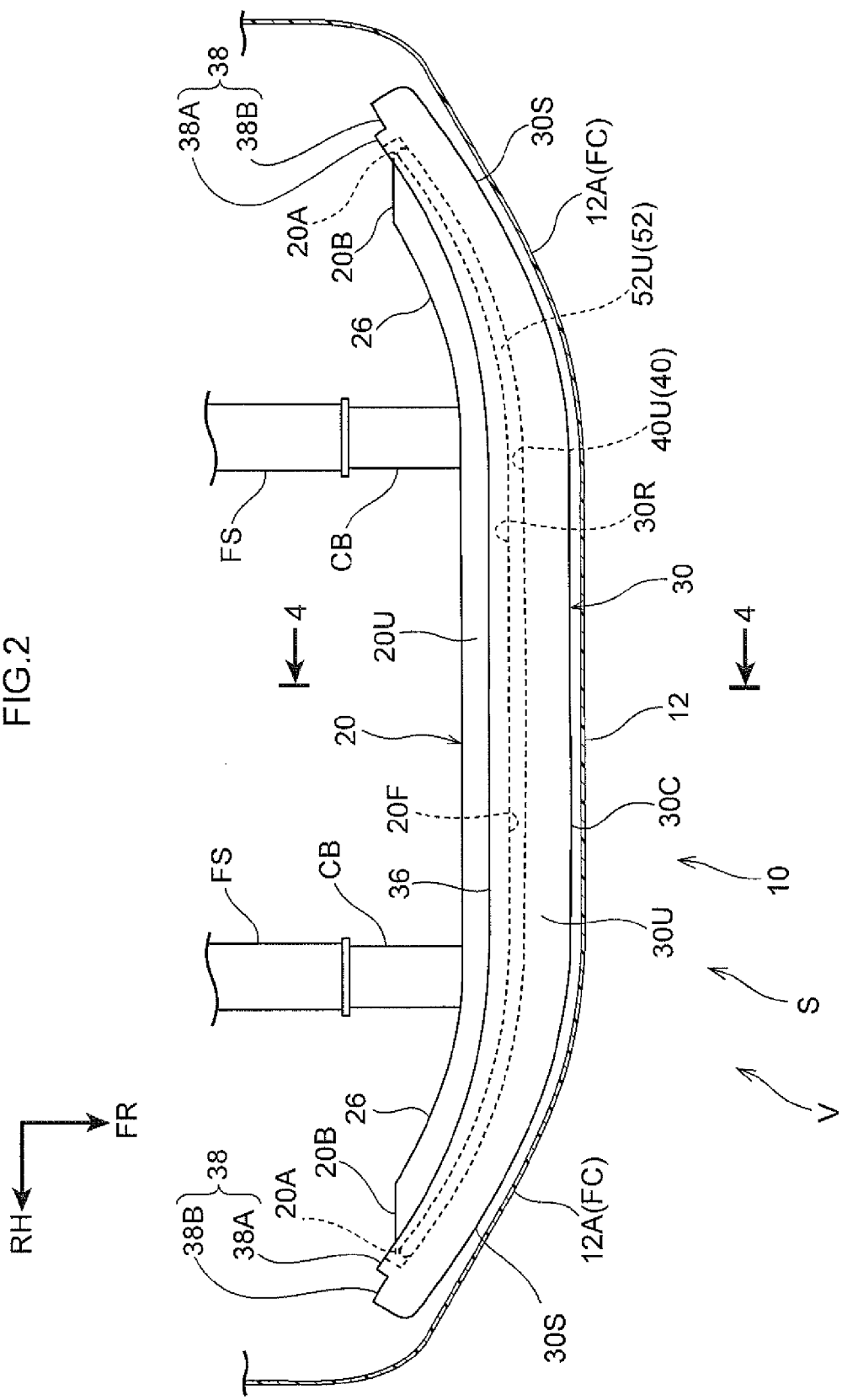

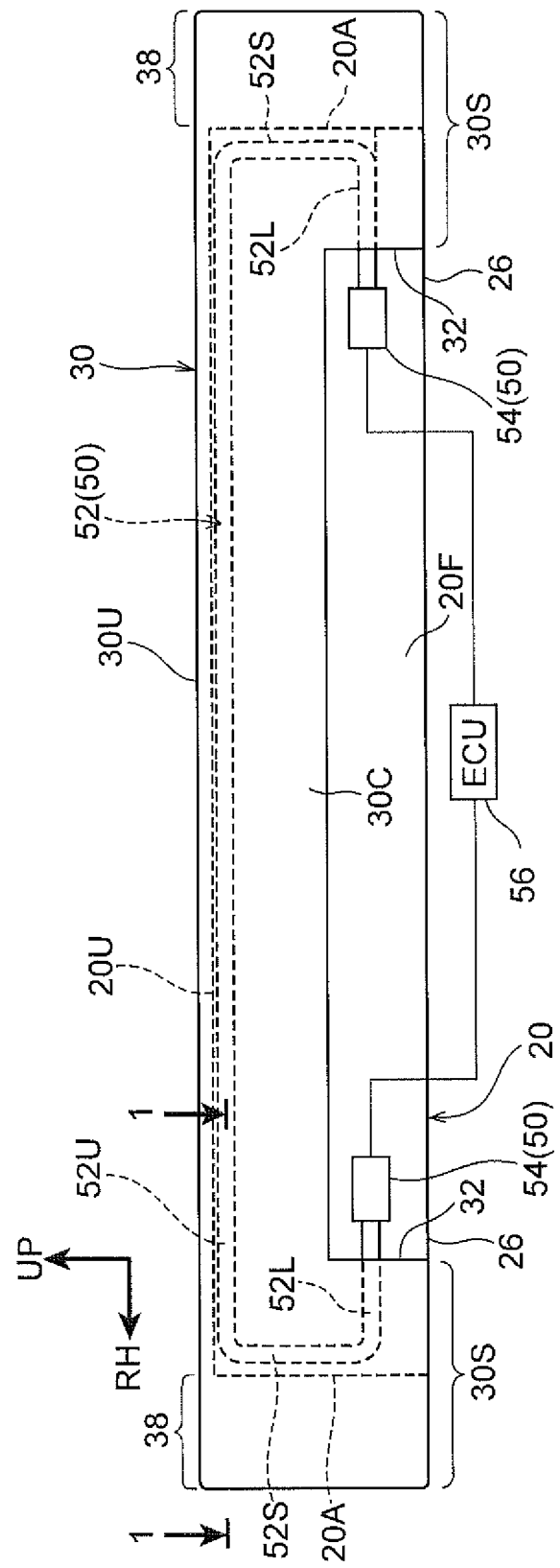

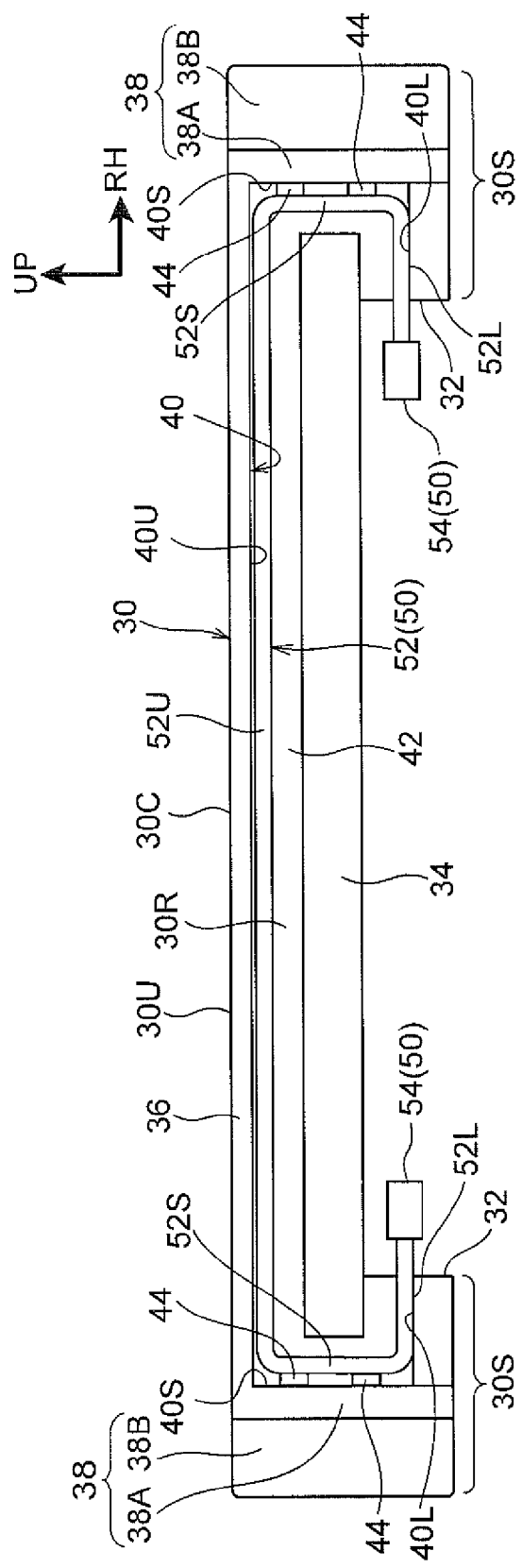

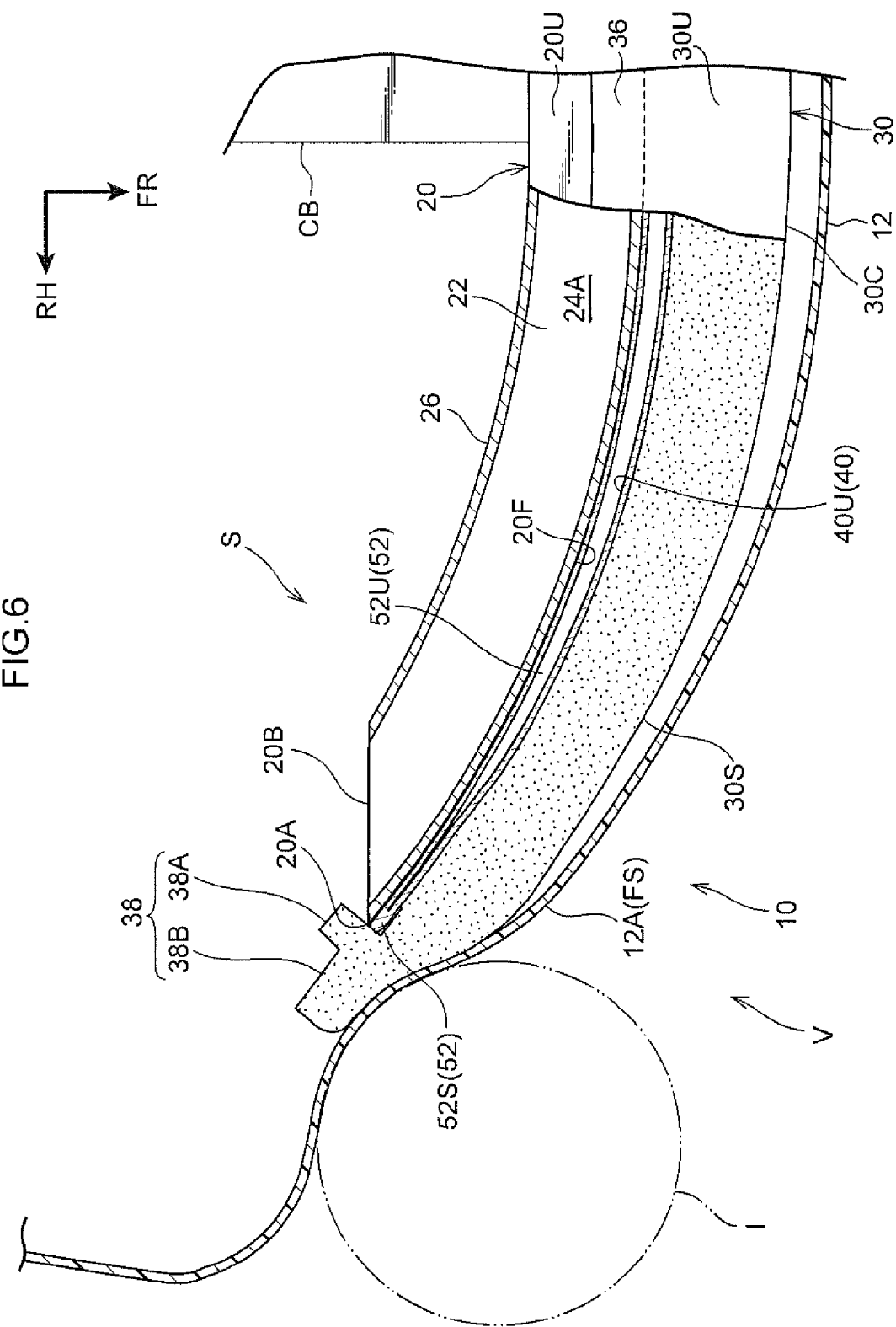

US 9,718,423 B2

VEHICLE BUMPER STRUCTURE INCLUDING A PEDESTRIAN COLLISION DETECTION SENSOR

CROSS-REFERENCE TO RELATED APPLICATIONS

This application is based on and claims priority under 35 USC 119 from Japanese Patent application No. 2014-209469 filed on Oct. 10, 2014, the disclosure of which is incorporated by reference herein.

BACKGROUND

Technical Field

The present invention relates to a vehicle bumper structure including a pedestrian collision detection sensor.

Related Art

In a vehicle bumper structure including a pedestrian collision detection sensor described in International Publication (WO) No. 2012/113362, a pressure tube is provided between bumper reinforcement and an absorber, and the pressure tube extends along a vehicle width direction. In the event of a collision between the vehicle and a colliding body, the pressure tube is pressed and squashed by the absorber and the bumper reinforcement, and a pressure sensor outputs a signal according to a change in pressure in the pressure tube. An ECU thereby determines whether or not the colliding body colliding with the vehicle is a pedestrian. Note that Japanese Patent Application Laid-Open (JP-A) No. 2007-069707, WO 2011/128971, and JP-A No. 2011-245910 also describe vehicle bumper structures including a pedestrian collision detection sensor.

A pedestrian colliding with the vehicle tends to fall onto a front hood. Thus, when the ECU determines that the colliding body is a pedestrian, the front hood is lifted up by a pop-up hood device to protect the pedestrian. It is therefore preferable to set a detection range of the pedestrian collision detection sensor in the vehicle width direction to a maximum width of the front hood, for example, from the perspective of pedestrian protection.

However, if both vehicle width direction end sections of the bumper reinforcement are extended further toward the vehicle width direction outer sides than the maximum width of the front hood in order to set the detection range of the pedestrian collision detection sensor as described above, then a placement space of the bumper reinforcement would increase. In damageability testing (light front-end collision testing), for example, there would accordingly be a possibility of interference between the vehicle width direction outer end portions of the bumper reinforcement and peripheral components disposed at the vehicle rear side of the bumper reinforcement.

SUMMARY

In consideration of the above circumstances, the present disclosure provides a vehicle bumper structure including a pedestrian collision detection sensor capable of securing a detection range in the vehicle width direction, while improving damageability performance with respect to peripheral components.

An aspect of the present disclosure is a vehicle bumper structure including a pedestrian collision detection sensor including: bumper reinforcement that is disposed at a vehicle rear side of a bumper cover provided at a front end of a vehicle, a length direction of the bumper reinforcement being a vehicle width direction; an absorber that extends along the vehicle width direction and is disposed adjacent to a vehicle front side of the bumper reinforcement; and a pedestrian collision detection sensor that includes a pressure tube extending along the vehicle width direction between the bumper reinforcement and the absorber, and that outputs a signal according to a change in pressure of the pressure tube, wherein a position of a vehicle width direction outer end of the bumper reinforcement is set between a first normal line and a second normal line, where a front-rear reference line is a line that passes through a vehicle width direction outer end of a front hood or an apron upper member in plan view and that extends along a vehicle front-rear direction, the first normal line is a line that passes through an intersection point between the front-rear reference line and the bumper cover in plan view and that extends along the direction of a normal line with respect to the vehicle width direction outer end of the bumper reinforcement, and the second normal line is a line that is offset by 100 mm to a vehicle width direction inner side of the first normal line in plan view.

In the vehicle bumper structure including a pedestrian collision detection sensor of the present aspect, the bumper reinforcement is disposed with its length direction along the vehicle width direction at the vehicle rear side of the bumper cover. The absorber that extends along the vehicle width direction is disposed adjacent the vehicle front side of the bumper reinforcement. The pressure tube of the pedestrian collision detection sensor extends along the vehicle width direction between the bumper reinforcement and the absorber.

When the line that passes through the vehicle width direction outer end of the front hood or the apron upper member in plan view and that extends along the vehicle front-rear direction configures the front-rear reference line, it is preferable to configure a vehicle width direction detection range of the pedestrian collision detection sensor as far as the front-rear reference line, from the perspective of pedestrian protection. Further, it has been found that, in a collision between the vehicle (bumper cover) and a colliding body disposed on the front-rear reference line, collision load from the colliding body is propagated in the following manner. First, a point at which the colliding body and the bumper cover make contact with each other configures a contact intersection point. A line passing through the contact intersection point and running along the direction of the normal line with respect to the vehicle width direction outer end of the bumper reinforcement configures a reference normal line. It has been found that, in such cases, the above collision load mainly propagates in a propagation area between a first sloped line sloping 30° toward the vehicle width direction inner side, and a second sloped line sloping 30° toward the vehicle width direction outer side, with respect to the reference normal line about the contact intersection point. Disposing the vehicle width direction outer end portion of the bumper reinforcement in this propagation area thereby enables the pressure tube to be deformed (squashed) by the bumper reinforcement and the absorber, and a signal according to the change in pressure of the pressure tube to be output by the pedestrian collision detection sensor.

The line that passes through the intersection point between the front-rear reference line and the bumper cover in plan view and that extends along the direction of the normal line with respect to the vehicle width direction outer end of the bumper reinforcement configures the first normal line. Moreover, the line offset by 100 mm to the vehicle width direction inner side of the first normal line configures the second normal line. Taking conditions in each vehicle type (such as a slope angle of the vehicle width direction outer end portion of the bumper reinforcement with respect to the vehicle width direction) into consideration, either part or all of the propagation area can be covered by a region between the first normal line and the second normal line.

The position of the vehicle width direction outer end of the bumper reinforcement is set between the first normal line and the second normal line. Thus, by disposing the vehicle width direction outer end portion of the bumper reinforcement in the propagation area in the region between the first normal line and the second normal line corresponding to the conditions in each vehicle type, a colliding body disposed on the front-rear reference line can be detected without extending the vehicle width direction outer end of the bumper reinforcement further toward the vehicle width direction outer side than the front-rear reference line. In particular, in cases in which the vehicle width direction outer end portion of the bumper reinforcement slopes toward the vehicle rear side, the vehicle width direction outer end of the bumper reinforcement is disposed further toward the vehicle width direction inner side than the front-rear reference line. This enables the vehicle width direction detection range of the pedestrian collision detection sensor to be secured, while preventing interference between the vehicle width direction outer end portion of the bumper reinforcement and peripheral components disposed at the vehicle rear side of the bumper reinforcement during damageability testing (light front-end collision testing). Namely, this enables the vehicle width direction detection range to be secured, while improving damageability performance with respect to peripheral components.

The present aspect may be configured such that a vehicle width direction outer end portion of the bumper reinforcement slopes toward the vehicle rear side as progressing toward the vehicle width direction outer side in plan view; and a vehicle width direction outer end face of the bumper reinforcement is formed along the vehicle width direction in plan view.

The above configuration enables to suppress projection of the vehicle width direction outer end face of the bumper reinforcement toward the vehicle rear side, compared to, for example, a case in which a vehicle width direction outer end face of the bumper reinforcement is formed along a direction orthogonal to the length direction of the bumper reinforcement in plan view. This enables damageability performance with respect to peripheral components disposed at the vehicle rear side of the bumper reinforcement to be further improved.

The present aspect may be configured such that the pressure tube includes: a pressure tube main portion that extends along the vehicle width direction at the vehicle front side of an upper portion of the bumper reinforcement; and a pressure tube side portion that extends from a length direction outer end of the pressure tube main portion toward the vehicle lower side, and that is disposed at the vehicle front side of the vehicle width direction outer end portion of the bumper reinforcement.

In the above configuration, the pressure tube is configured including the pressure tube main portion and the pressure tube side portion. The pressure tube main portion extends along the vehicle width direction at the vehicle front side of the upper portion of the bumper reinforcement. The pressure tube side portion extends from the length direction outer end of the pressure tube main portion toward the vehicle lower side, and is disposed at the vehicle front side of the vehicle width direction outer end portion of the bumper reinforcement. The entire pressure tube side portion is thereby squashed (deformed) during a collision between a corner section of the vehicle and a colliding body, enabling the squash amount (deformation amount) of the pressure tube to be increased. This enables the sensitivity of the pedestrian collision detection sensor at the corner section of the vehicle to be effectively increased.

The present aspect may be configured such that: the absorber includes: a groove section that is formed to a rear face of the absorber and into which the pressure tube is fitted; and an overhang portion that is a vehicle width direction outer portion of the groove section into which the pressure tube side portion is fitted, the overhang portion projecting out toward the vehicle width direction outer side with respect to the vehicle width direction outer end of the bumper reinforcement.

In the above configuration, the groove section is formed to the rear face of the absorber, and the pressure tube is fitted into the groove section. Moreover, the vehicle width direction outer portion of the groove section into which the pressure tube side portion is fitted is configured by an overhang portion.

The overhang portion projects out toward the vehicle width direction outer side with respect to the vehicle width direction outer end of the bumper reinforcement. Thus, in the groove section into which the pressure tube side portion is fitted, only a vehicle width direction inner portion of the groove section is supported from the vehicle rear side by the bumper reinforcement, and the vehicle width direction outer portion (the overhang portion) of the groove section is not supported by the bumper reinforcement. Thus, the overhang portion moves toward the vehicle rear side without being impeded by the bumper reinforcement during a collision between the corner section of the vehicle and a colliding body, thereby enabling the deformation amount of the pressure tube side portion to be further increased. This enables the sensitivity of the pedestrian collision detection sensor at the corner section of the vehicle to be effectively increased.

The present aspect may be configured such that the absorber includes an extension portion that extends from the overhang portion toward the vehicle width direction outer side.

In the above configuration, the extension portion is pressed toward the vehicle rear side by a colliding body during a collision between the corner section of the vehicle and the colliding body, thereby enabling the pressure tube side portion to be pressed still more favorably. This enables the sensitivity of the pedestrian collision detection sensor at the corner section of the vehicle to be effectively increased.

The present aspect may be configured such that: the absorber includes an absorber upper end section that projects out further toward the vehicle rear side than an upper face of the bumper reinforcement, and that is disposed adjacent to a vehicle upper side of the groove section into which the pressure tube main portion is fitted; and the absorber upper end section comprises a jutting portion that juts out further toward the vehicle rear side than a front face of the bumper reinforcement and is disposed adjacent to the upper face of the bumper reinforcement.

In the above configuration, the absorber upper end section is disposed adjacent to the vehicle upper side of the groove section into which the pressure tube main portion is fitted. Namely, a vehicle upper side portion of the groove section into which the pressure tube main portion is fitted is configured by the absorber upper end section. The absorber upper end section projects out further toward the vehicle upper side than the upper face of the bumper reinforcement.

Thus, in the groove section into which the pressure tube main portion is fitted, only a vehicle lower side portion of the groove section is supported from the vehicle rear side by the bumper reinforcement, and the vehicle upper side portion of the groove section is unsupported by the bumper reinforcement. Thus, the absorber upper end section moves toward the vehicle rear side without being impeded by the bumper reinforcement during a collision between the vehicle and a colliding body, thereby enabling the pressure tube to be pressed, even by a comparatively small collision load. This enables the pressure tube to be effectively pressed, even in vehicles that include a bumper cover with comparatively high strength, for example.

Moreover, the absorber upper end section is formed with the jutting portion jutting out further toward the vehicle rear side than the front face of the bumper reinforcement, and the jutting portion is disposed adjacent to the upper face of the bumper reinforcement. Thus, the jutting portion covers between the front face of the bumper reinforcement and a rear face of the absorber from the vehicle upper side. This enables foreign matter such as small stones to be prevented from intruding between the bumper reinforcement and the absorber.

The present aspect may be configured such that the absorber includes a hollowed portion that is formed at a rear portion of the absorber and that is open toward the vehicle rear side and the vehicle lower side in side view.

In the above configuration, the hollowed portion is formed to the rear portion of the absorber, and the hollowed portion is open toward the vehicle rear side and the vehicle lower side in side view. This enables deformation load resistance at the rear portion of the absorber (a peripheral portion of the groove section) to be configured comparatively low, while securing deformation load resistance at a front portion of the absorber. This enables the pressure tube to be deformed favorably by deformation of the rear portion of the absorber, while absorbing collision energy at the front portion of the absorber during a collision between the vehicle and a colliding body.

The present aspect may be configured such that the absorber includes a projection portion that is formed at a vehicle width direction outer portion of the absorber and that projects out toward the vehicle lower side; the pedestrian collision detection sensor comprises a pressure sensor provided at a length direction outer end of the pressure tube; and the pressure sensor is fixed to a front face of the bumper reinforcement at the vehicle width direction inner side of the projection portion.

In the above configuration, the projection portion projecting out toward the vehicle lower side is formed at the vehicle width direction outer portion of the absorber. The pressure sensor provided at the length direction outer end of the pressure tube is fixed to the front face of the bumper reinforcement at the vehicle width direction inner side of the projection portion. This enables space at the vehicle width direction inner side of the projection portion to be effectively utilized for fixing the pressure sensor to the front face of the bumper reinforcement.

The present aspect may be configured such that a position of the vehicle width direction outer end of the bumper reinforcement is set between a third normal line and a first sloped line, where the third normal line is a line that passes through a contact intersection point between a colliding body employed in damage testing and the bumper cover, and that runs along the direction of a normal line with respect to the vehicle width direction outer end of the bumper reinforcement, and the first sloped line is a line that slopes at a specific angle toward the vehicle width direction inner side centered on the contact intersection point.

In the above configuration, the specific angle may be 30°.

These configurations also enables the vehicle width direction detection range to be secured, while improving damageability performance with respect to peripheral components.

BRIEF DESCRIPTION OF THE DRAWINGS

Exemplary embodiments will be described in detail based on the following figures, wherein:

FIG. 1 is a plan cross-section view (an enlarged cross-section taken along line 1-1 in FIG. 3A) illustrating a vehicle right side section of a front bumper applied with a vehicle bumper structure including a pedestrian collision detection sensor according to an exemplary embodiment;

FIG. 2 is a plan view illustrating the entire front bumper illustrated in FIG. 1;

FIG. 3A is a front view illustrating a state in which the absorber illustrated in FIG. 2 is fixed to bumper reinforcement, as viewed from the vehicle front side;

FIG. 3B is a back view illustrating a state in which a pressure tube is fitted into the absorber illustrated in FIG. 3A, as viewed from the vehicle rear side;

FIG. 6 is a plan cross-section view illustrating a deformed state of a pressure tube when an impactor has collided with a vehicle width direction outer section of the bumper cover illustrated in FIG. 1.

DETAILED DESCRIPTION

Figure 4:
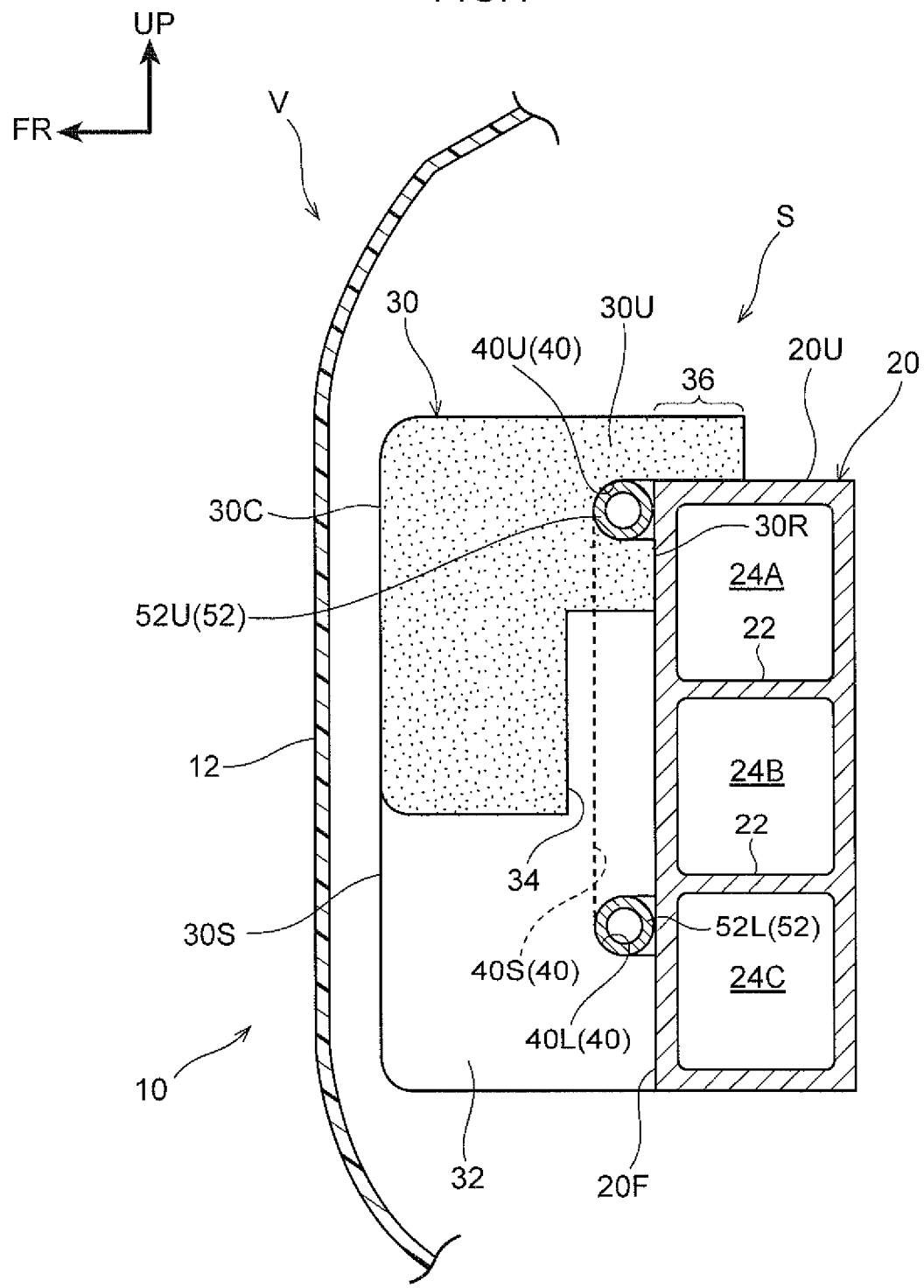
FIG. 4 is a cross-section (an enlarged cross-section taken along line 4-4 in FIG. 2) illustrating a vehicle width direction center section of the front bumper illustrated in FIG. 2, as viewed from the vehicle left side.

Explanation follows regarding a front bumper 10 of a vehicle (automobile) V applied with a vehicle bumper structure S including a pedestrian collision detection sensor 50 according to an exemplary embodiment, with reference to the drawings. In the drawings, the arrow FR indicates the vehicle front side, the arrow UP indicates the vehicle upper side, and the arrow RH indicates the vehicle right side (one vehicle width direction side). Unless specifically stated otherwise, reference simply to front-rear, up-down, and left-right directions refers to the front-rear of the vehicle front-rear direction, the up-down of the vehicle up-down direction, and the left and right of the vehicle (when facing forward).

As illustrated in FIG. 2, the front bumper 10 is disposed at a front end section of the vehicle V, and detects (whether or not there is) a collision between the vehicle V and a colliding body. The front bumper 10 includes a bumper cover 12 configuring a front end of the vehicle V, bumper reinforcement 20 forming a bumper frame member, and an absorber 30 disposed between the bumper cover 12 and the bumper reinforcement 20. As illustrated in FIG. 3A and FIG. 3B, the front bumper 10 also includes a pedestrian collision detection sensor 50 for detecting a collision between the vehicle V and a colliding body. Explanation follows regarding configuration of each of the above, followed by explanation regarding setting positions of vehicle width direction outer ends 20A of the bumper reinforcement 20.

Bumper Cover 12

As illustrated in FIG. 2, the bumper cover 12 is made of resin. The bumper cover 12 extends along the vehicle width direction, and is supported by being fixed to the vehicle body at a section not illustrated in the drawings. Vehicle width direction outer sections 12A of the bumper cover 12 slope toward the vehicle rear side on progression toward the vehicle width direction outer sides in plan view, configuring front side corner sections FC of the vehicle V.

Bumper Reinforcement 20

The bumper reinforcement 20 is formed in an elongated shape with its length direction along the vehicle width direction, and is disposed at the rear side of the bumper cover 12. The bumper reinforcement 20 is formed by an aluminum-based metal material, for example, manufactured by a method such as extrusion forming, and formed in a hollow, substantially rectangular column shape. Specifically, as illustrated in FIG. 4, plate shaped reinforcement ribs 22 are provided inner side the bumper reinforcement 20. The reinforcement ribs 22 are disposed with their plate thickness direction in the up-down direction, and couple together a front wall and a rear wall of the bumper reinforcement 20. The bumper reinforcement 20 has a cross-section structure in which plural (three in the present exemplary embodiment) substantially rectangular shaped closed cross-sections are arranged in a row in the up-down direction. Namely, in the present exemplary embodiment, a pair of the reinforcement ribs 22 is disposed in a row in the up-down direction inside the bumper reinforcement 20. The closed cross-section disposed at an upper portion of the bumper reinforcement 20 is an upper side closed cross-section 24A, the closed cross-section disposed at an up-down direction intermediate portion of the bumper reinforcement 20 is an intermediate closed cross-section 24B, and the closed cross-section disposed at a lower portion of the bumper reinforcement 20 is a lower side closed cross-section 24C.

As illustrated in FIG. 2, a pair of left and right front side members FS, formimg frame members at the vehicle body side, extends along the front-rear direction at the rear side of the bumper reinforcement 20. Side portions at both vehicle width direction ends of the bumper reinforcement 20 are coupled to front ends of the respective front side members FS through crash boxes CB. Vehicle width direction outer end sections of the bumper reinforcement 20 project out toward the vehicle width direction outer sides of the front side members FS, and slope in curved shapes diagonally toward the rear side following the vehicle width direction outer sections 12A of the bumper cover 12. These sloped sections configure sloped sections 26. Note that the sloped sections 26 may slope in straight lines diagonally toward the rear side in plan view.

Vehicle width direction outer end faces 20B of the bumper reinforcement 20 are formed running along the vehicle width direction in plan view. Namely, the vehicle width direction outer end faces 20B of the bumper reinforcement 20 are disposed in a plane orthogonal to the front-rear direction.

Absorber 30

The absorber 30 is configured by a foamed resin material, namely urethane foam or the like. The absorber 30 is provided between the bumper cover 12 and the bumper reinforcement 20, formed in an elongated shape with its length direction along the vehicle width direction, and disposed adjacent to a front face 20F of the bumper reinforcement 20.

As illustrated in FIG. 3A, the absorber 30 is formed in an inverted, substantially U-shape that is open toward the lower side in front view. Specifically, the absorber 30 is configured including an absorber center section 30C configuring a length direction intermediate section of the absorber 30, and a pair of left and right absorber side sections 30S configuring vehicle width direction outer sections of the absorber 30. Lower end portions of the absorber side sections 30S project out toward the lower side with respect to the absorber center section 30C, and the projection portions configure lower projection portions 32, each serving as a "projection portion".

As illustrated in FIG. 4, the absorber center section 30C is formed in an inverted, substantially L-shape in side cross-section view, and is disposed at the front side of a portion that is substantially the upper half of the bumper reinforcement 20. A hollowed portion 34 is formed at a rear end side lower portion of the absorber center section 30C. The hollowed portion 34 is open toward the rear side and lower side in side cross-section view, and formed in a step shape. An up-down dimension at a front end portion of the absorber center section 30C is thereby set larger than an up-down dimension at a rear end portion of the absorber center section 30C. The hollowed portion 34 extends along the vehicle width direction, and vehicle width direction outer end portions of the hollowed portion 34 extend as far as in front of side groove portions 40S, described later (see FIG. 3B).

Each absorber side section 30S is formed in a substantially rectangular shape in side view, and extends along the up-down direction from an upper end to a lower end of the bumper reinforcement 20 at the front side of the sloped section 26 of the bumper reinforcement 20. A rear face 30R of the absorber 30 is fixed to the front face 20F of the bumper reinforcement 20. The front face 20F of the bumper reinforcement 20 is thereby exposed toward the front side between the pair of left and right lower projection portions 32 (see FIG. 3A).

An upper end section of the absorber 30 is referred to as an absorber upper end section 30U. The absorber upper end section 30U projects further toward the upper side than an upper face 20U of the bumper reinforcement 20, and is formed in a substantially rectangular shape with its length direction along the front-rear direction in side cross-section view. A rear end portion of the absorber upper end section 30U juts out toward the rear side with respect to the rear face 30R of the absorber 30 (the front face 20F of the bumper reinforcement 20), and the jutting portion is referred to as a jutting portion 36. The jutting portion 36 is disposed adjacent to the upper side of the upper face 20U of the bumper reinforcement 20. Thus, the jutting portion 36 abuts the upper face 20U of the bumper reinforcement 20, and is configured capable of moving toward the rear side relative to the upper face 20U. An up-down dimension of the absorber upper end section 30U (jutting portion 36) is set at a minimum dimension required to form the absorber 30 (for example, from 8 mm to 15 mm in the present exemplary embodiment).

As illustrated in FIG. 1, vehicle width direction outer end sections of the absorber 30 (absorber side sections 30S) project out (overhang) toward the vehicle width direction outer sides with respect to the vehicle width direction outer ends 20A of the bumper reinforcement 20, and the projecting portions is referred to as side projection sections 38. Each side projection section 38 includes an overhang portion 38A configuring a base end portion of the side projection section 38, and an extension portion 38B configuring a leading end portion of the side projection section 38.

Each overhang portion 38A is formed in a substantially rectangular shape with its length direction along the thickness direction of the absorber 30 in plan cross-section view. A rear end portion of the overhang portion 38A projects out toward the rear side with respect to the front face 20F of the bumper reinforcement 20, and is disposed at the vehicle width direction outer side of the vehicle width direction outer end 20A of the bumper reinforcement 20. A gap G along the length direction of the bumper reinforcement 20 is formed between the rear end portion of the overhang portion 38A and the vehicle width direction outer end 20A of the bumper reinforcement 20. The overhang portion 38A is thereby configured capable of moving toward the rear side relative to the bumper reinforcement 20 (specifically, toward one side of a direction orthogonal to the front face 20F of the bumper reinforcement 20). A width dimension of the overhang portion 38A is set at a minimum dimension required to form the absorber 30 (for example, from 8 mm to 15 mm in the present exemplary embodiment).

Each extension portion 38B is formed in a substantially rectangular shape in cross-section plan view, and extends from the overhang portion 38A toward the vehicle width direction outer side. A rear face of the extension portion 38B is disposed so as follow the rear face 30R of the absorber 30 (not illustrated in FIG. 1). The rear end portion of the overhang portion 38A described above accordingly projects out further toward the rear side than the extension portion 38B.

As illustrated in FIG. 3B, the rear face 30R of the absorber 30 is formed with a groove section 40 for retaining a pressure tube 52, described later. The groove section 40 extends overall along the vehicle width direction, and is formed in a substantially C-shape open toward the lower side as viewed from the rear side. The groove section 40 is also formed in a substantially U-shape open toward the rear side in cross-section viewed along its length direction (see FIG. 4). The groove section 40 is configured by an upper groove portion 40U formed to the absorber center section 30C and the absorber side sections 30S, the pair of left and right side groove portions 40S formed to the respective absorber side sections 30S, and a pair of left and right lower groove portions 40L formed to the respective lower projection portions 32 of the absorber side sections 30S. Specific explanation follows below.

The upper groove portion 40U extends in a straight line along the vehicle width direction. As illustrated in FIG. 4, the upper groove portion 40U is disposed adjacent to the lower side of the absorber upper end section 30U, and faces an upper end edge portion of the bumper reinforcement 20 in the front-rear direction. Namely, in the absorber 30, an upper side portion of the upper groove portion 40U is configured by the absorber upper end section 30U. A portion of the absorber center section 30C configuring the lower side of the upper groove portion 40U configures a groove lower portion 42, and the groove lower portion 42 is supported from the rear side by the front face 20F of the bumper reinforcement 20. The hollowed portion 34, described previously, is formed at the lower side of the groove lower portion 42, and an up-down dimension of the groove lower portion 42 is set as appropriate so that the groove lower portion 42 undergoes squashing deformation favorably during a collision between the vehicle V and a colliding body (pedestrian). A groove width dimension of the upper groove portion 40U is set slightly larger than an outer diameter dimension of the pressure tube 52, described later.

As illustrated in FIG. 3B, each side groove section 40S extends in a straight line along the up-down direction, and an upper end of the side groove section 40S is connected to a vehicle width direction outer end of the upper groove portion 40U. As illustrated in FIG. 1, the side groove section 40S is disposed adjacent to the vehicle width direction inner side of the overhang portion 38A, and faces an edge portion of the vehicle width direction outer end 20A of the bumper reinforcement 20 along the front-rear direction. Namely, in the absorber 30, a vehicle width direction outer portion of the side groove section 40S is configured by the overhang portion 38A, and a location of the absorber side section 30S configuring the vehicle width direction inner side of the side groove section 40S is supported from the rear side by the front face 20F of the bumper reinforcement 20. A groove width dimension of the side groove section 40S is set larger than the groove width dimension of the upper groove portion 40U, by the amount of the gap G previously described.

As illustrated in FIG. 3B, plural (two locations in the present exemplary embodiment) stopper portions 44 are formed inside each side groove section 40S. The stopper portions 44 project out from the overhang portion 38A toward the vehicle width direction inner side, and are disposed in a row in the up-down direction. Thus, the groove width dimension of the side groove section 40S at the locations where the stopper portions 44 are formed is smaller than the groove width dimension of the side groove section 40S at other locations, and is set substantially the same as the groove width dimension of the upper groove portion 40U. Thus, when the pressure tube 52, described later, has been fitted into the side groove portions 40S, movement of the pressure tube 52 toward the gap G sides (vehicle width direction outer sides) is restricted by the stopper portions 44.

Each lower groove portion 40L extends in a straight line along the vehicle width direction, and a vehicle width direction outer end of the lower groove section 40L is connected to a lower end of the side groove section 40S. The lower groove section 40L is formed at a substantially central portion in the up-down direction of the lower projection portion 32, and a vehicle width direction inner end of the lower groove section 40L is open toward the vehicle width direction inner side. A groove width dimension of the lower groove section 40L is set the same as the groove width dimension of the upper groove portion 40U.

Pedestrian Collision Detection Sensor 50

As illustrated in FIG. 3A and FIG. 3B, the pedestrian collision detection sensor 50 includes the pressure tube 52 formed in an elongated shape, and pressure sensors 54 that output signals according to a change in pressure in the pressure tube 52.

The pressure tube 52 is configured as a hollow structural body with a substantially circular ring shaped cross-section (see FIG. 4). The outer diameter dimension of the pressure tube 52 is set slightly smaller than the groove width dimension of the upper groove portion 40U of the absorber 30, and the length direction length of the pressure tube 52 is set longer than the length direction length of the groove section 40 formed to the absorber 30. The pressure tube 52 is installed (fitted) inside the groove section 40.

Thus, the pressure tube 52 is routed in a substantially C-shape open toward the lower side and extends overall along the vehicle width direction as viewed along the front-rear direction. Specifically, the pressure tube 52 includes a pressure tube main portion 52U routed in the upper groove portion 40U, pressure tube side portions 52S routed in the side groove portions 40S, and pressure tube lower portions 52L routed in the lower groove portions 40L. The pressure tube main portion 52U extends along the vehicle width direction at the front side of the upper end edge portion of the bumper reinforcement 20 (see FIG. 4), the pressure tube side portions 52S extend along the up-down direction at the front side of the edge portions of the vehicle width direction outer ends 20A of the bumper reinforcement 20 (see FIG. 1), and the pressure tube lower portions 52L extend along the vehicle width direction at the front side of the sloped sections 26 of the bumper reinforcement 20. Namely, in each absorber side section 30S, two sections of the pressure tube 52 are routed in a row in the up-down direction, and one section of the pressure tube 52 is routed along the up-down direction. Both length direction end portions of the pressure tube 52 extend out from the lower projection portions 32 of the absorber side sections 30S toward the vehicle width direction inner side, and are disposed at the lower side of the absorber center section 30C.

The pressure sensors 54 are provided at both vehicle width direction ends of the pressure tube 52. As illustrated in FIG. 3A, the pressure sensors 54 are fixed to the front face 20F of the bumper reinforcement 20 at the vehicle width direction inner side of the lower projection portions 32 by brackets, not illustrated in the drawings. The pressure sensors 54 are electrically connected to an ECU 56 (an element broadly understood to be a "collision determination section"). Signals are output from the pressure sensors 54 to the ECU 56 according to the change in pressure inner side of the pressure tube 52 when the pressure tube 52 deforms.

A collision speed sensor (not illustrated in the drawings) is also electrically connected to the ECU 56, and the collision speed sensor outputs a signal according to collision speed with a colliding body to the ECU 56. The ECU 56 then computes the collision load based on the output signals of the pressure sensors 54, and computes the collision speed based on the output signal of the collision speed sensor. The ECU 56 then derives an effective mass of the colliding body from the computed collision load and collision speed, determines whether or not the effective mass exceeds a threshold value, and determines whether the body colliding with the front bumper 10 is a pedestrian, or an object other than a pedestrian (for example, a roadside obstacle such as a roadside marker or a guide post).

Setting Position of Vehicle Width Direction Outer Ends 20A of Bumper Reinforcement 20

Figure 5A:
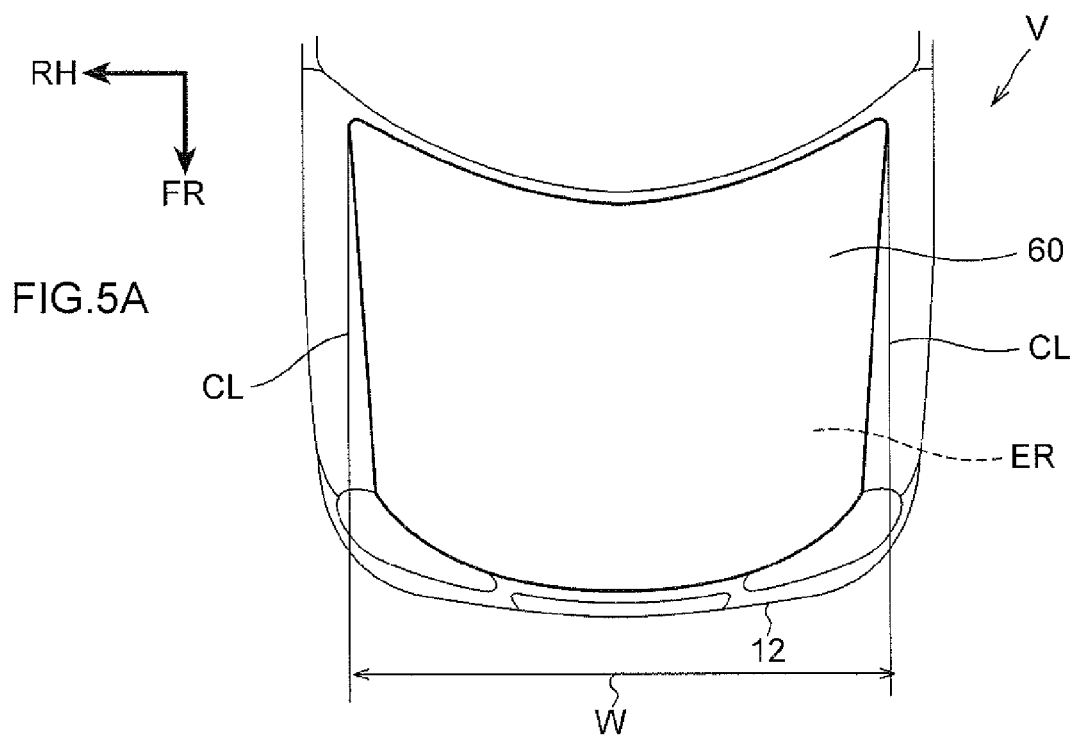
FIG. 5A is a plan view illustrating a front section of a vehicle for explaining a front-rear reference line employed when setting a position of a vehicle width direction outer end of the bumper reinforcement illustrated in FIG. 1.

As illustrated in FIG. 5A, a front hood 60 that opens and closes an engine room ER is provided at a front section of the vehicle V. In the event of a collision between the bumper cover 12 of the vehicle V and (the legs of) a pedestrian, the pedestrian tends to fall onto the front hood 60. Thus, when a collision between the vehicle V and a pedestrian is determined by the pedestrian collision detection sensor 50, the front hood 60 is lifted toward the upper side by a pop-up hood device, not illustrated in the drawings, such that the pedestrian falling onto the front hood 60 is protected. A detection range of the pedestrian collision detection sensor 50 in the vehicle width direction is thereby set at a maximum width of the front hood 60 (see the range illustrated by the arrow W in FIG. 5A), from the perspective of pedestrian protection.

Cut-off lines defining the maximum width of the front hood 60 are configured by front-rear reference lines CL. Namely, the front-rear reference lines CL extend along the vehicle front-rear direction, and pass through vehicle width direction outer ends of the front hood 60. Note that in the example illustrated in FIG. 5A, the vehicle width direction outer ends of the front hood 60 are locations at both rear end sides of the front hood 60; however, the locations differ according to the shape of the front hood in each vehicle type.

It has been found that, in a collision between the vehicle V (bumper cover 12) and a colliding body, collision load from the colliding body is propagated in the following manner. This point is explained with regards to a collision between an impactor I (colliding body) disposed on the front-rear reference line CL and the bumper cover 12, with reference to FIG. 1. First, as illustrated in FIG. 1, an intersection point at which the impactor I (envisaged to be an impactor with a diameter of 120mm) and the bumper cover 12 make contact with each other is referred to as a contact intersection point P1. A line passing through the contact intersection point P1 and running along the direction of a normal line with respect to the vehicle width direction outer end 20A of the bumper reinforcement 20 (a direction orthogonal to the front face 20F of the bumper reinforcement 20) is referred to as a reference normal line NL. It has been found that in such cases, the above collision load mainly propagates in a propagation area A1 (a range indicated by the arrow A1 in FIG. 1) between a first sloped line SL1 sloping 30° toward the vehicle width direction inner side with respect to the reference normal line (third normal line) NL, and a second sloped line SL2 sloping 30° toward the vehicle width direction outer side with respect to the reference normal line NL, about the contact intersection point P1. In the present exemplary embodiment, the position of the vehicle width direction outer end 20A of the bumper reinforcement 20 is set inside an area A2 (a range indicated by the arrow A2 in FIG. 1) between the reference normal line NL and the first sloped line SL1, such that a deformation amount (change in pressure) of the pressure tube 52 during a collision between the bumper cover 12 and the impactor I on the front-rear reference line CL is increased, as explained in detail later.

Note that in the vehicle V described above, a sub-radiator 62 (a peripheral component) is provided at the rear side of each sloped section 26 of the bumper reinforcement 20, and the sub-radiator 62 is disposed substantially in the vicinity of the front-rear reference line CL in the vehicle width direction.

Explanation follows regarding operation and effects of the present exemplary embodiment.

In the vehicle V including the front bumper 10 configured as described above, the bumper cover 12 is deformed toward the rear side by the impactor I and presses the absorber 30 during a collision between the vehicle V and a colliding body (impactor I). The absorber 30 is thereby pressed and squashed (undergoes compression deformation) in the front-rear direction, and the pressure tube 52 deforms (is squashed). Pressure inside the pressure tube 52 thereby changes (increases).

The pressure sensors 54 then output signals corresponding to the pressure change in the pressure tube 52 to the ECU 56, and the ECU 56 computes the collision load based on the output signals from the pressure sensors 54. The ECU 56 also computes the collision speed based on the output signal from the collision speed sensor. The ECU 56 then derives the effective mass of the colliding body from the computed collision load and collision speed, determines whether or not the effective mass exceeds the threshold value, and thereby determines whether or not the body colliding with the front bumper 10 is a pedestrian.

Explanation follows regarding a case of a collision between the corner section FC (vehicle width direction outer section 12A of the bumper cover 12) of the vehicle V, and the impactor I disposed on the front-rear reference line CL. In this case, when the impactor I and the bumper cover 12 collide, collision load is input from the impactor Ito the absorber 30 (absorber side section 30S). As illustrated in FIG. 1, when this occurs, the collision load input from the impactor I mainly propagates in the propagation area A1 between the first sloped line SL1 sloping 30° toward the vehicle width direction inner side about the contact intersection point P1, and the second sloped line SL2 sloping 30° toward the vehicle width direction outer side about the contact intersection point P1, with respect to the reference normal line NL passing through the contact intersection point P1 of the impactor I and the bumper cover 12.

Note that in the present exemplary embodiment, the vehicle width direction outer end 20A of the bumper reinforcement 20 is disposed inside the area A2 between the reference normal line NL and the first sloped line SL1 in plan view. Collision load is accordingly transmitted to the absorber side section 30S and the bumper reinforcement 20 disposed inside the area A2. The pressure tube 52 is thereby pressed and squashed by the absorber side section 30S and the bumper reinforcement 20 (see FIG. 6), and pressure in the pressure tube 52 changes. This enables a collision with the impactor I disposed on the front-rear reference line CL to be detected by the pedestrian collision detection sensor 50, even when the vehicle width direction outer end 20A of the bumper reinforcement 20 is disposed further to the vehicle width direction inner side than the front-rear reference line CL. There is accordingly no need to extend the vehicle width direction outer end 20A of the bumper reinforcement 20 as far as the front-rear reference line CL, thereby enabling an increase in placement space of the bumper reinforcement 20 to be suppressed. The enables interference between the bumper reinforcement 20, and the sub-radiator 62 (peripheral component) disposed at the rear side of the sloped section 26 of the bumper reinforcement 20, to be suppressed during damageability testing (light front-end collision testing). This enables the detection range of the pedestrian collision detection sensor 50 to be secured, while improving damageability performance with respect to peripheral components.

Further, the vehicle width direction outer end 20A of the bumper reinforcement 20 is disposed at the vehicle width direction inner side of the reference normal line NL. This enables the sensitivity of the pedestrian collision detection sensor 50 at each corner section FC of the vehicle V to be increased. Explanation follows regarding this point. As illustrated in FIG. 1, the vehicle width direction outer end 20A of the bumper reinforcement 20 is disposed at the vehicle width direction inner side of the reference normal line NL, such that (the sloped section 26 of) the bumper reinforcement 20 is not disposed at the vehicle width direction outer side of the reference normal line NL. Thus, only a portion of the absorber side section 30S excluding the side projection section 38 is pressed and squashed by both the impactor I and the bumper reinforcement 20, and the side projection section 38 of the absorber side section 30S is only pressed by the impactor I.

This enables a range at which the absorber side section 30S is squashed by both the impactor I and the bumper reinforcement 20 to be narrower in the vehicle width direction than in a hypothetical case in which the vehicle width direction outer end 20A of the bumper reinforcement 20 extends as far as the second sloped line SL2. Namely, this enables a range in which the absorber side section 30S is squashed by both the impactor I and the bumper reinforcement 20 to be made narrower, and intrusion of the impactor I toward the absorber side section 30S side to be increased. This enables the deformation amount (squash amount of the pressure tube 52 (pressure tube side portion 52S) to be increased compared to hypothetical cases such as that above in which the vehicle width direction outer end 20A of the bumper reinforcement 20 extends to the second sloped line SL2. This enables the sensitivity of the pedestrian collision detection sensor 50 at each corner section FC of the vehicle V to be increased.

In the pressure tube 52, the pressure tube side portion 52S routed in each side groove section 40S of the absorber 30 is disposed at the front side of the edge portion of the vehicle width direction outer end 20A of the bumper reinforcement 20, and extends along the vehicle up-down direction. Thus, the entire pressure tube side portion 52S, and portions of the pressure tube main portion 52U and the pressure tube lower portion 52L, are squashed during a collision between the corner section FC of the vehicle V and the impactor I (see FIG. 6). This enables the deformation amount of the pressure tube 52 to be further increased, while the pressure tube 52 undergoes squashing deformation at an early stage. Since the change in pressure in the pressure tube 52 during a collision between the corner section FC of the vehicle V and the impactor I is thereby further increased, the sensitivity of the pedestrian collision detection sensor 50 with respect to the corner section FC of the vehicle V can be effectively increased.

Explanation follows regarding this point, with comparison to a Comparative Example. Note that in the Comparative Example, an entire pressure tube extends along the vehicle width direction, similarly to in technology hitherto. Namely, in the pressure tube of Comparative Example, portions corresponding to the pressure tube side portions 52S and the pressure tube lower portions 52L of the present exemplary embodiment extend from the vehicle width direction outer ends of a pressure tube main portion 52U toward the vehicle width direction outer sides. Thus, a bumper reinforcement of the Comparative Example extends further toward the vehicle width direction outer sides than the bumper reinforcement 20 of the present exemplary embodiment, and in an absorber of the Comparative Example, portions corresponding to the side projection sections 38 of the absorber 30 of the present exemplary embodiment are supported from the rear side by the bumper reinforcement, and retain the pressure tube.

In the Comparative Example with the above configuration, sloped sections of the bumper reinforcement slope toward the vehicle rear side, such that the portions corresponding to the pressure tube side portions 52S and the pressure tube lower portions 52L of the present exemplary embodiment are disposed further toward the rear side than the pressure tube main portion 52U. The impactor I accordingly needs to intrude still further toward the rear side than in the present exemplary embodiment in order to press and squash the portions corresponding to the pressure tube side portions 52S and the pressure tube lower portions 52L.

When the impactor I intrudes further toward the rear side, absorption of collision energy of the impactor I is increased, due to squashing deformation of the absorber supported by the bumper reinforcement. Loss of the collision energy of the impactor I accordingly increases, and load (pressing force) acting on the pressure tube when the portions corresponding to the pressure tube side portions 52S and the pressure tube lower portions 52L are pressed by the impactor I is reduced.

In contrast thereto, in the present exemplary embodiment, each pressure tube side portion 52S extends out from a vehicle width direction outer end of the pressure tube main portion 52U toward the lower side, thereby enabling the pressure tube side portion 52S and the pressure tube lower portion 52L to be disposed further toward the front side than in the Comparative Example. This enables the pressure tube side portion 52S to be deformed (squashed) at an early stage, in an initial collision stage when the loss of collision energy of the impactor I is small. This enables the pressure tube 52 to be deformed at an early stage, and also enables the deformation amount of the pressure tube 52 to be increased compared to the above Comparative Example.

In the present exemplary embodiment, each pressure tube side portion 52S extends along the up-down direction, thereby enabling the entire pressure tube side portion 52S to be pressed and squashed during the initial collision stage, when the loss of collision energy of the impactor I is small. This enables the deformation amount of the pressure tube 52 to be further increased.

Figure 7A:
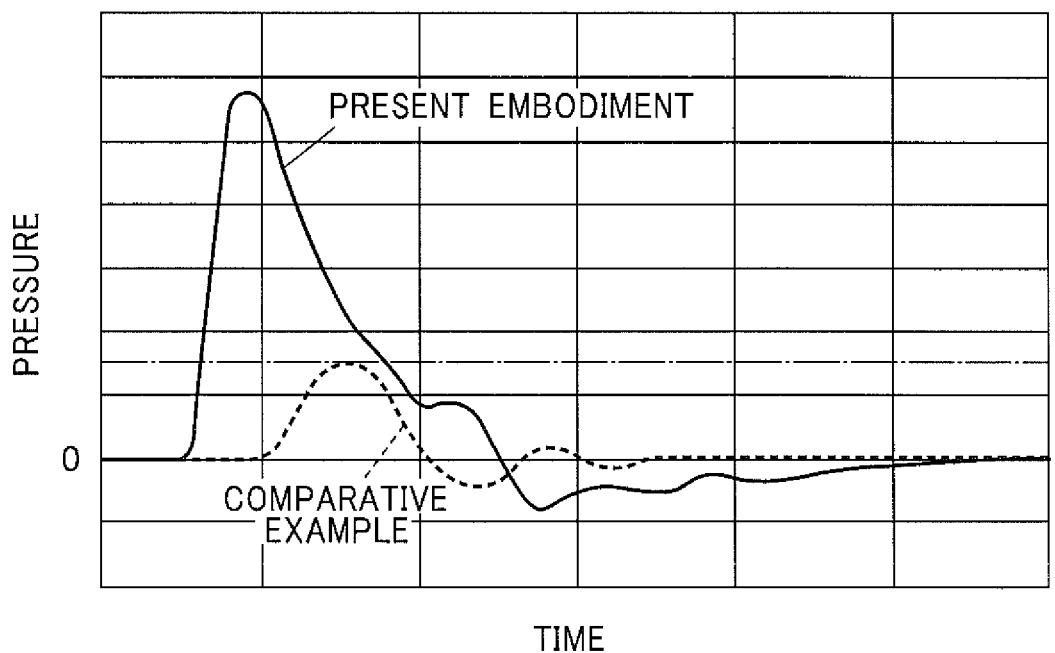
FIG. 7A is a graph for explaining pressure change in a pressure tube and in a Comparative Example when an impactor has collided with a vehicle width direction outer section of a bumper cover.

Thus, as illustrated in the graph in FIG. 7A, the present exemplary embodiment enables the pressure tube 52 to be deformed (squashed) at an earlier stage than in the Comparative Example, and enables pressure inside the pressure tube 52 to be substantially four times higher than pressure inside the pressure tube of the Comparative Example. Note that in the graph illustrated in FIG. 7A, the horizontal axis indicates time elapsed during a collision between the vehicle V and the impactor I, and the vertical axis indicates pressure inside the pressure tube 52. In FIG. 7A, the data illustrated by the intermittent line is data of the Comparative Example, and the data illustrated by the solid line is data of the present exemplary embodiment. The single dotted-dashed line on the vertical axis is an example of a target pressure of the pressure tube 52.

In the absorber 30 of the present exemplary embodiment, a vehicle width direction outer portion of each side groove portion 40S, into which the pressure tube side portion 52S is fitted, is configured by the overhang portion 38A. The overhang portion 38A projects out (overhangs) toward the vehicle width direction outer side of the vehicle width direction outer end 20A of the bumper reinforcement 20. Thus, only a vehicle width direction inner side portion of the side groove portion 40S in the absorber side section 30S is supported from the rear side by the front face 20F of the bumper reinforcement 20. Thus, a reaction force from the bumper reinforcement 20 against the collision load from the impactor I only acts on the vehicle width direction inner portion of the side groove section 40S in the absorber side section 30S, and does not act on the overhang portion 38A. Thus, the overhang portion 38A adjacent to the side groove section 40S moves toward the rear side relative to the bumper reinforcement 20 without being impeded by the bumper reinforcement 20 during a collision between the vehicle V and the impactor I, thereby enabling the pressure tube 52 to be pressed and squashed by the absorber side section 30S in a favorable manner.

Each side projection section 38 of the absorber 30 is formed with the extension portion 38B extending from the overhang portion 38A toward the vehicle width direction outer side. The extension portion 38B is accordingly pressed toward the rear side by the impactor I accompanying intrusion of the impactor I toward the rear side during a collision between the vehicle V and the impactor I disposed on the front-rear reference line CL. Since the side projection section 38 accordingly bends at its foot (namely, the side groove section 40S), the pressure tube 52 (pressure tube side portion 52S) can be further pressed and squashed in a favorable manner.

Each vehicle width direction outer end face 20B of the bumper reinforcement 20 is formed along the vehicle width direction in plan view. Thus, the vehicle width direction outer end face 20B of the bumper reinforcement 20 can be suppressed from projecting out toward the rear side, compared to a hypothetical case in which the vehicle width direction outer end face 20B of the bumper reinforcement 20 is formed along a direction orthogonal to the length direction of the bumper reinforcement 20 in plan view. This enables the damageability performance of the bumper reinforcement 20 with respect to peripheral components such as the sub-radiator 62 to be further improved.

The absorber 30 is formed in a substantially U-shape open toward the lower side in front view, and the pair of left and right lower projection portions 32 of the absorber 30 project out further toward the lower side than the absorber center section 30C. The front face 20F of the bumper reinforcement 20 is exposed between the pair of left and right lower projection portions 32, and the pressure sensors 54 of the pedestrian collision detection sensor 50 are fixed to the front face 20F of the bumper reinforcement 20 at the vehicle width direction inner side of the lower projection portions 32. This enables a space at the vehicle width direction inner side of the lower projection portions 32 to be effectively utilized for fixing the pressure sensors 54 to the front face 20F of the bumper reinforcement 20.

In the absorber 30, the absorber upper end section 30U is disposed adjacent to the upper side of the upper groove portion 40U, and configures an upper side portion of the upper groove portion 40U. The absorber upper end section 30U projects further toward the upper side than the upper face 20U of the bumper reinforcement 20. Thus, only the groove lower portion 42 of the absorber 30 is supported from the rear side by the bumper reinforcement 20. Reaction force against the collision load from the impactor I accordingly only acts on the groove lower portion 42 from the bumper reinforcement 20, and does not act on the absorber upper end section 30U from the bumper reinforcement 20. Thus, the absorber upper end section 30U adjacent to the upper groove portion 40U moves toward the rear side relative to the bumper reinforcement 20, without being impeded by the bumper reinforcement 20 during a collision between the vehicle V and the impactor I, such that the pressure tube main portion 52U is pressed and squashed by the absorber 30 favorably. This enables the pressure tube 52 to be deformed (squashed) in a favorable manner, even when the collision load input to the absorber 30 is comparatively low. The pressure tube 52 can be effectively deformed (squashed) even when, for example, the front bumper 10 is configured by a bumper cover 12 that is configured with comparatively high strength (such as a bumper cover configured by a two-layered structure in the front-rear direction), due to specifications, etc. of the vehicle V.

The absorber upper end section 30U is formed with the jutting portion 36 jutting out toward the rear side with respect to the front face 20F of the bumper reinforcement 20, and the jutting portion 36 is disposed adjacent to the upper face 20U of the bumper reinforcement 20. Thus, the jutting portion 36 covers between the front face 20F of the bumper reinforcement 20 and the rear face 30R of the absorber 30 from the upper side. This enables, for example, foreign matter such as small stones that have intruded into the vehicle V from a bumper grille or the like assembled to the bumper cover 12 to be prevented from intruding between the bumper reinforcement 20 and the absorber 30.

A rear portion of the absorber 30 is formed with the hollowed portion 34 open toward the rear side and lower side in side view, at a position at the lower side of the groove section 40. This enables the deformation load resistance at the rear portion of the absorber 30 (groove lower portion 42) to be configured comparatively low, while securing deformation load resistance at a front portion of the absorber 30. This enables the pressure tube 52 to be deformed favorably by deformation of the groove lower portion 42 of the absorber 30, while the front portion of the absorber 30 absorbs collision energy during a collision between the vehicle V and the impactor I.

Figure 7B:
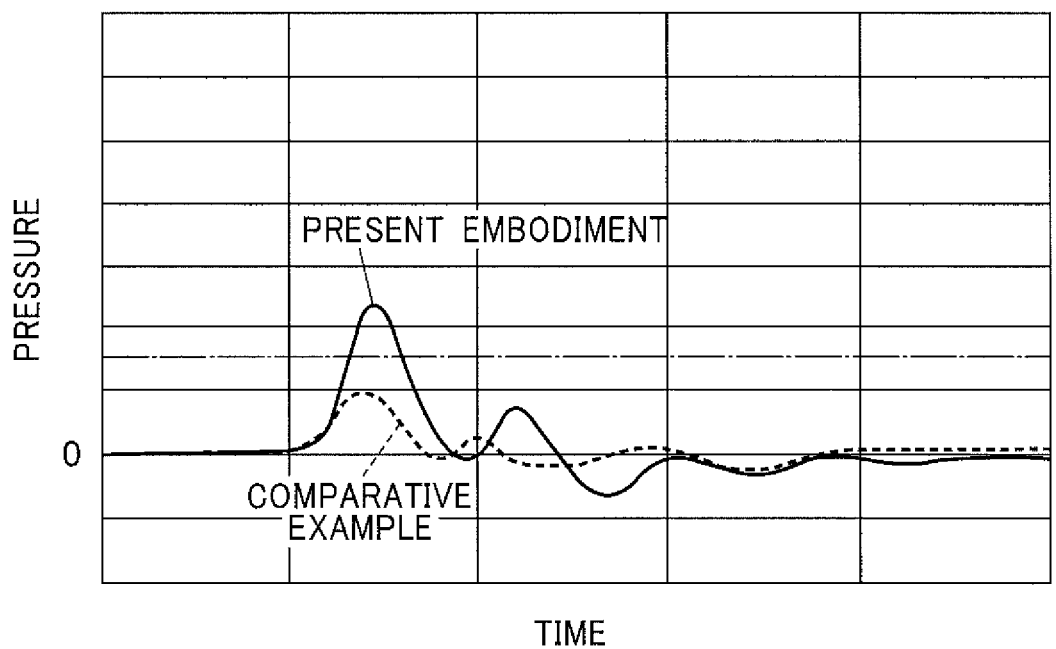
FIG. 7B is a graph for explaining pressure change in a pressure tube and in the Comparative Example when an impactor has collided with a vehicle width direction center section of a bumper cover.

Explanation follows regarding this point, with comparison to a Comparative Example using the graph illustrated in FIG. 7B. Note that the hollowed portion 34 of the present exemplary embodiment is omitted from an absorber of the Comparative Example. In the absorber of the Comparative Example, a portion corresponding to the absorber upper end section 30U of the present exemplary embodiment is supported from the rear side by bumper reinforcement similarly to in technology hitherto. In other words, an upper side portion and a lower side portion of a groove portion are supported from the rear side by the bumper reinforcement in the Comparative Example. In the graph illustrated in FIG. 7B, the horizontal axis indicates time elapsed during a collision between the impactor I and the vehicle V, and the vertical axis indicates pressure in the pressure tube 52. In FIG. 7B, the data illustrated by the intermittent line is data of the Comparative Example, and the data illustrated by the solid line is data of the present exemplary embodiment. The single dotted-dashed line on the vertical axis is an example of a target pressure of the pressure tube 52.

When a vehicle V and an impactor collide in the Comparative Example, since the hollowed portion 34 of the present exemplary embodiment is omitted from the absorber of the Comparative Example, a surface area supported by the bumper reinforcement is larger than in the present exemplary embodiment. In the absorber of the Comparative Example, since the portion corresponding to the absorber upper end section 30U of the present exemplary embodiment is also supported by the bumper reinforcement, the upper side portion of the groove portion cannot move toward the rear side relative to the bumper reinforcement. Thus, a pressure tube is less easily squashed in the Comparative Example. In contrast thereto, in the present exemplary embodiment as previously described, the surface area supported by the bumper reinforcement 20 is smaller, and the absorber upper end section 30U adjacent to the upper groove portion 40U is capable of relative movement toward the rear side. As illustrated in FIG. 7B, the present exemplary embodiment thereby enables pressure in the pressure tube 52 to be substantially twice as high as the pressure in the pressure tube of the Comparative Example. This enables the pressure tube 52 to be to be deformed favorably by the absorber 30, while collision energy is absorbed by the front portion of the absorber 30 during a collision between the vehicle V and the impactor I.

In the present exemplary embodiment, the gap G is formed in the vehicle width direction between each overhang portion 38A of the absorber 30 and the vehicle width direction outer end 20A of the bumper reinforcement 20. Thus, even if the absorber 30 expands or contracts in the length direction due to temperature changes in the usage environment of the vehicle V, this expansion or contraction can be absorbed by the gap G. This enables the overhang portion 38A to be suppressed from striking the bumper reinforcement 20 during a collision between the vehicle V and the impactor I, even when the temperature in the usage environment has changed.

In the present exemplary embodiment, the sensitivity of the pedestrian collision detection sensor 50 at the corner sections FC of the vehicle V is high, and the position of each vehicle width direction outer end 20A of the bumper reinforcement 20 is set inside the area A2 between the reference normal line NL and the first sloped line SL1 from the perspective of improving damageability performance in the vehicle V. In place of this, the position of each vehicle width direction outer end 20A of the bumper reinforcement 20 may be set as below. As illustrated in FIG. 1, collision load mainly propagates in the propagation area A1 between the first sloped line SL1 and the second sloped line SL2 during a collision between the bumper cover 12 and the impactor I. Thus, the position of the vehicle width direction outer end 20A of the bumper reinforcement 20 may be disposed further toward the vehicle width direction outer side than in the present exemplary embodiment. Specifically, first, a line passing through an intersection point P2 of the front-rear reference line CL and the bumper cover 12 in plan view and running along the direction of a normal line with respect to the vehicle width direction outer end 20A of the bumper reinforcement 20 is referred to as a first normal line NL1. A line offset by 100 mm toward the vehicle width direction inner side of the first normal line NL1 is referred to as a second normal line NL2. The vehicle width direction outer end 20A of the bumper reinforcement 20 may be disposed inside an area A3 (the range of the arrow A3 in FIG. 1) between the first normal line NL1 and the second normal line NL2.

Explanation follows regarding this point. Each sloped section 26 of the bumper reinforcement 20 is sloped according to the styling or design of the bumper cover 12 of the vehicle V. Since the sloped section 26 of the bumper reinforcement 20 is formed by bending the bumper reinforcement 20 after extrusion forming the bumper reinforcement 20, the slope angle (angle with respect to the vehicle width direction) of the sloped section 26 of the bumper reinforcement 20 cannot be made larger than a specific angle (substantially 30°), due to processing restrictions. Thus, the slope angle is set within a range from 0° to 30°, according to the styling or design of each vehicle type.

In pedestrian leg protection performance testing, an outer diameter dimension of the impactor I differs depending on the testing standard. Envisaging a case in which the impactor I with the largest outer diameter is employed, the outer diameter dimension of the impactor I is 120 mm.

As described previously, each vehicle width direction outer section 12A of the bumper cover 12 is set so as to follow the sloped section 26 of the bumper reinforcement 20 in plan view. Thus, when the slope angle of the sloped section 26 is set at the maximum of 30°, and the outer diameter dimension of the impactor I is set at 120 mm, the propagation area A1 of the collision load of the impactor I can be covered by the area A3 by offsetting the second normal line NL2 by approximately 80 mm toward the vehicle width direction inner side of the first normal line NL1. It is conceivable that the propagation area A1 is enlarged due to differences in the strength (rigidity) or the like of the bumper cover 12 according to each vehicle type. Thus, 20 mm is added to the 80 mm above, and the second normal line NL2 is set at a line offset by approximately 100 mm toward the vehicle width direction inner side of the first normal line NL1. This enables part or all of the propagation area A1 to be covered by the area A3, even in cases in which the slope angle of the sloped section 26 of the bumper reinforcement 20 is set within the range from 0° to 30°. Thus, by setting the vehicle width direction outer end 20A of the bumper reinforcement 20 in the propagation area Al in the area A3 corresponding to the slope angle of the sloped section 26 of each vehicle type, a collision with the impactor I disposed on the front-rear reference line CL can be detected by the pedestrian collision detection sensor 50, without disposing the vehicle width direction outer end 20A of the bumper reinforcement 20 further toward the vehicle width direction outer side than the front-rear reference line CL.

Figure 5B:
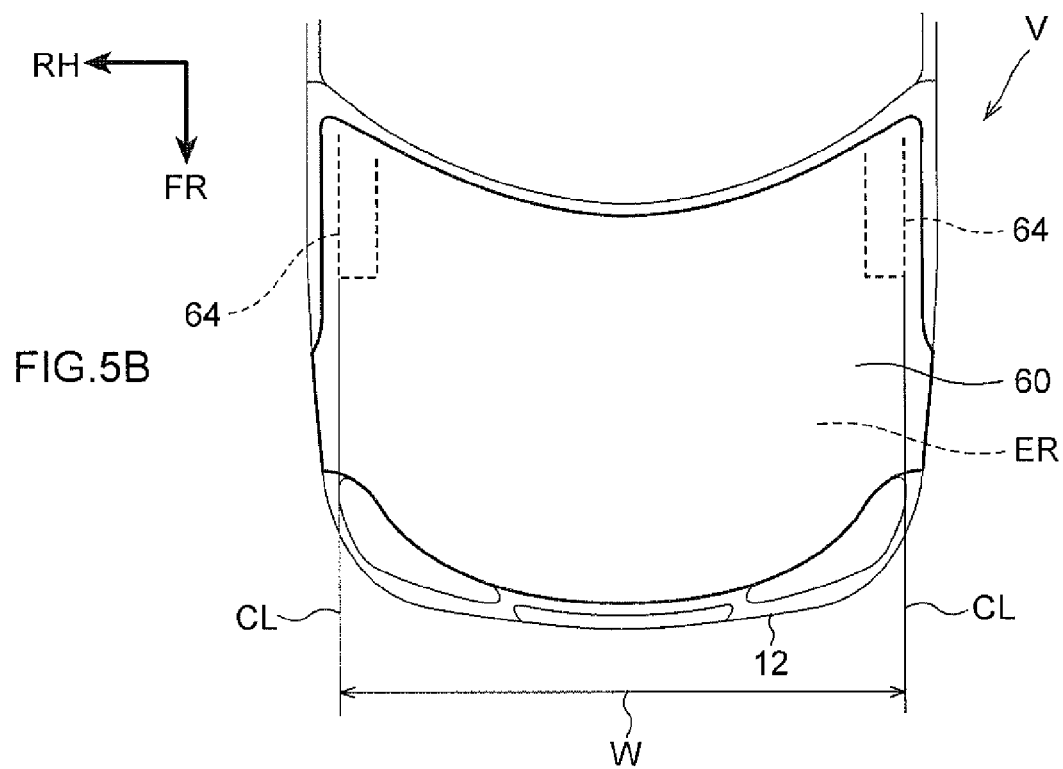
FIG. 5B is a plan view illustrating a front section of a vehicle for explaining a front-rear reference line in a vehicle with a different configuration of front hood to that illustrated in FIG. 5A.

In the present exemplary embodiment, the cut-off lines of the front hood 60 are set as the front-rear reference lines CL, and the positions of the vehicle width direction outer ends 20A of the bumper reinforcement 20 are set using the front-rear reference lines CL, from the perspective of protecting a pedestrian falling onto the front hood 60. In contrast, in the case of the vehicle V including a front hood 60 such as that illustrated in FIG. 5B, the front-rear reference lines CL may be replaced by lines along the vehicle front-rear direction passing through vehicle width direction outer ends of apron upper members 64. Namely, in the vehicle V illustrated in FIG. 5B, the vehicle width direction outer ends of the front hood 60 are sometimes formed at the outermost profile of the vehicle V, depending on the styling or design of the front hood 60. However, an object of lifting the front hood 60 during a collision with a pedestrian is so that the pedestrian does not directly contact members with comparatively high strength, such as the apron upper members 64, inside the engine room ER. Thus, in vehicles V such as that illustrated in FIG. 5B, it is sufficient to set as far as the vehicle width direction outer ends of the apron upper members 64 as a pedestrian protection target region. Thus, in cases in which the front hood 60 extends as far as the outermost profile of the vehicle V, the front-rear reference lines CL may be replaced by lines along the vehicle front-rear direction passing through the vehicle width direction outer ends of the apron upper members 64.

In the present exemplary embodiment, the vehicle width direction outer end faces 20B of the bumper reinforcement 20 are formed along the vehicle width direction in plan view. In place of this, the vehicle width direction outer end faces 20B of the bumper reinforcement 20 may, for example, be formed in a direction orthogonal to the length direction of the bumper reinforcement 20 in plan view, in consideration of distances (gaps) between the bumper reinforcement 20 and peripheral components such as the sub-radiators 62 in each vehicle type.

In the present exemplary embodiment, the overhang portions 38A of the absorber 30 are not supported from the rear side by the front face 20F of the bumper reinforcement 20. In place of this, the overhang portions 38A may be supported from the rear side by the front face 20F of the bumper reinforcement 20.

In the present exemplary embodiment, the rear end portion of each overhang portion 38A projects out toward the rear side with respect to the rear face of the extension portion 38B of the absorber 30. In place of this, as illustrated by the double-dotted dashed line in FIG. 1, the rear face of the extension portion 38B may be disposed in the same plane as a rear face of the overhang portion 38A. In such cases, the side projection section 38 of the absorber 30 can be configured with a higher bending rigidity, since the extension portion 38B has a larger thickness dimension. This enables the side projection section 38 to be further bent in a favorable manner at the location of the side groove section 40S, when the side projection section 38 is pressed toward the rear side by the impactor I. The extension portions 38B may be omitted from the absorber 30, according to the layout or the like in each vehicle type.

In the present exemplary embodiment, the portion configuring the upper side of the groove section 40 (namely, the absorber upper end section 30U) is not supported from the rear side by the front face 20F of the bumper reinforcement 20. In place of this, the portion configuring the upper side of the groove section 40 may be supported from the rear side by the front face 20F of the bumper reinforcement 20. In such cases, for example, the upper groove portion 40U may be disposed further lower than in the present exemplary embodiment.

In the present exemplary embodiment, the pressure sensors 54 are fixed to the front face of the bumper reinforcement 20 at the vehicle width direction inner side of the lower projection portions 32 of the absorber 30; however, fixing positions of the pressure sensors 54 may be set as appropriate.

In the present exemplary embodiment, the hollowed portion 34 is formed to the absorber 30; however, the hollowed portion 34 may be omitted from the absorber 30.

What is claimed is:
1. A vehicle bumper structure comprising:
   a bumper reinforcement that is disposed at a vehicle rear side of a bumper cover provided at a front end of a vehicle, a length direction of the bumper reinforcement being a vehicle width direction;
   an absorber that extends along the vehicle width direction and is disposed adjacent to a vehicle front side of the bumper reinforcement; and
   a pedestrian collision detection sensor that includes a pressure tube extending along the vehicle width direction between the bumper reinforcement and the absorber, and that outputs a signal according to a change in pressure of the pressure tube,
   wherein the pressure tube comprises:
   a pressure tube main portion that extends along the vehicle width direction at the vehicle front side of an upper portion of the bumper reinforcement; and
   a pressure tube side portion that extends from a length direction outer end of the pressure tube main portion toward a vehicle lower side, and that is disposed at the vehicle front side of the vehicle width direction outer end portion of the bumper reinforcement,
   wherein the absorber comprises:
   a groove section that is formed to a rear face of the absorber and into which the pressure tube is fitted;
   an overhang portion that is a vehicle width direction outer portion of the groove section into which the pressure tube side portion is fitted, the overhang portion projecting out toward the vehicle width direction outer side with respect to the vehicle width direction outer end of the bumper reinforcement; and
   an absorber upper end section that projects out further toward a vehicle upper side than an upper face of the bumper reinforcement, and that is disposed adjacent to a vehicle upper side of the groove section into which the pressure tube main portion is fitted; and wherein the absorber upper end section comprises a jutting portion that juts out further toward the vehicle rear side than a front face of the bumper reinforcement and is disposed adjacent to the upper face of the bumper reinforcement.

2. The vehicle bumper structure of claim 1, wherein the absorber comprises an extension portion that extends from the overhang portion toward the vehicle width direction outer side.

3. The vehicle bumper structure of claim 1, wherein the absorber comprises a hollowed portion that is formed at a rear portion of the absorber and that is open toward the vehicle rear side and the vehicle lower side in side view.

4. The vehicle bumper structure of claim 1, wherein:
the absorber comprises a projection portion that is formed at a vehicle width direction outer portion of the absorber and that projects down toward the vehicle lower side;
the pedestrian collision detection sensor comprises a pressure sensor provided at a length direction outer end of the pressure tube; and
the pressure sensor is fixed to a front face of the bumper reinforcement at the vehicle width direction inner side of the projection portion.

5. A vehicle bumper structure comprising:
a bumper reinforcement that is disposed at a vehicle rear side of a bumper cover provided at a front end of a vehicle, a length direction of the bumper reinforcement being a vehicle width direction;
an absorber that extends along the vehicle width direction and is disposed adjacent to a vehicle front side of the bumper reinforcement; and
a pedestrian collision detection sensor that includes a pressure tube extending along the vehicle width direction between the bumper reinforcement and the absorber, and that outputs a signal according to a change in pressure of the pressure tube,
wherein a position of a vehicle width direction outer end of the bumper reinforcement is set between a first normal line and a second normal line,
where a front-rear reference line is a line that passes through a vehicle width direction outer end of a front hood or an apron upper member in plan view and that extends along a vehicle front-rear direction,
the first normal line is a line that passes through an intersection point between the front-rear reference line and the bumper cover in plan view and that extends along a direction of a normal line with respect to the vehicle width direction outer end of the bumper reinforcement, and
the second normal line is a line that is offset by 100 mm to a vehicle width direction inner side of the first normal line in plan view, wherein:
a vehicle width direction outer end portion of the bumper reinforcement slopes toward the vehicle rear side on progression toward a vehicle width direction outer side in plan view; and
a vehicle width direction outer end face of the bumper reinforcement is formed along the vehicle width direction in plan view.

6. A vehicle bumper structure comprising:
a bumper reinforcement that is disposed at a vehicle rear side of a bumper cover provided at a front end of a vehicle, a length direction of the bumper reinforcement being a vehicle width direction;
an absorber that extends along the vehicle width direction and is disposed adjacent to a vehicle front side of the bumper reinforcement; and
a pedestrian collision detection sensor that includes a pressure tube extending along the vehicle width direction between the bumper reinforcement and the absorber, and that outputs a signal according to a change in pressure of the pressure tube,
wherein a position of a vehicle width direction outer end of the bumper reinforcement is set between a first normal line and a second normal line,
where a front-rear reference line is a line that passes through a vehicle width direction outer end of a front hood or an apron upper member in plan view and that extends along a vehicle front-rear direction,
the first normal line is a line that passes through an intersection point between the front-rear reference line and the bumper cover in plan view and that extends along a direction of a normal line with respect to the vehicle width direction outer end of the bumper reinforcement, and
the second normal line is a line that is offset by 100 mm to a vehicle width direction inner side of the first normal line in plan view, and
wherein a position of the vehicle width direction outer end of the bumper reinforcement is set between a third normal line and a first sloped line,
where the third normal line is a line that passes through a contact intersection point between a colliding body employed in damage testing and the bumper cover, and that runs along a direction of a normal line with respect to the vehicle width direction outer end of the bumper reinforcement, and
the first sloped line is a line that slopes at a specific angle toward the vehicle width direction inner side centered on the contact intersection point.

7. The vehicle bumper structure of claim 6, wherein the specific angle is 30°.

* * * * *